United States Patent [19]

Cohen et al.

[11] Patent Number: 4,463,453

[45] Date of Patent: Jul. 31, 1984

[54] ACOUSTIC INTENSITY MEASUREMENT APPARATUS AND METHOD INCLUDING PROBE HAVING AMBIENT NOISE SHIELD

[75] Inventors: Robert L. Cohen; Geir A. Dalan, both of Seattle, Wash.

[73] Assignee: The Boeing Company, Seattle, Wash.

[21] Appl. No.: 333,546

[22] Filed: Dec. 22, 1981

[51] Int. Cl.³ .......................... H04R 1/40; G01H 3/00
[52] U.S. Cl. ...................................... 367/135; 73/583; 73/646; 367/140; 367/910; 181/198
[58] Field of Search ....................... 381/87, 88, 91, 92; 181/198; 367/135, 140, 151, 910; 73/579, 583, 587, 591, 658, 659, 661, 802, 646, 647, 648

[56] References Cited

U.S. PATENT DOCUMENTS

| 1,396,402 | 11/1921 | Bristol | 181/198 |
| 3,581,012 | 5/1971 | Kishi et al. | 381/91 |
| 3,855,847 | 12/1974 | Leschek | 73/587 |
| 4,122,432 | 10/1978 | Triebold et al. | 367/135 |
| 4,236,040 | 11/1980 | Chung | 73/646 |
| 4,326,274 | 4/1982 | Hotta et al. | 367/140 |
| 4,354,059 | 10/1982 | Ishigaki et al. | 381/92 |

FOREIGN PATENT DOCUMENTS 2027318  2/1980 United Kingdom ............... 367/910

Primary Examiner—Richard A. Farley
Attorney, Agent, or Firm—Conrad O. Gardner; Bernard A. Donahue

[57] ABSTRACT

Acoustic intensity measuring apparatus for determining sound energy intensity utilizing a probe having a pair of microphones and an associated ambient noise shield.

4 Claims, 9 Drawing Figures

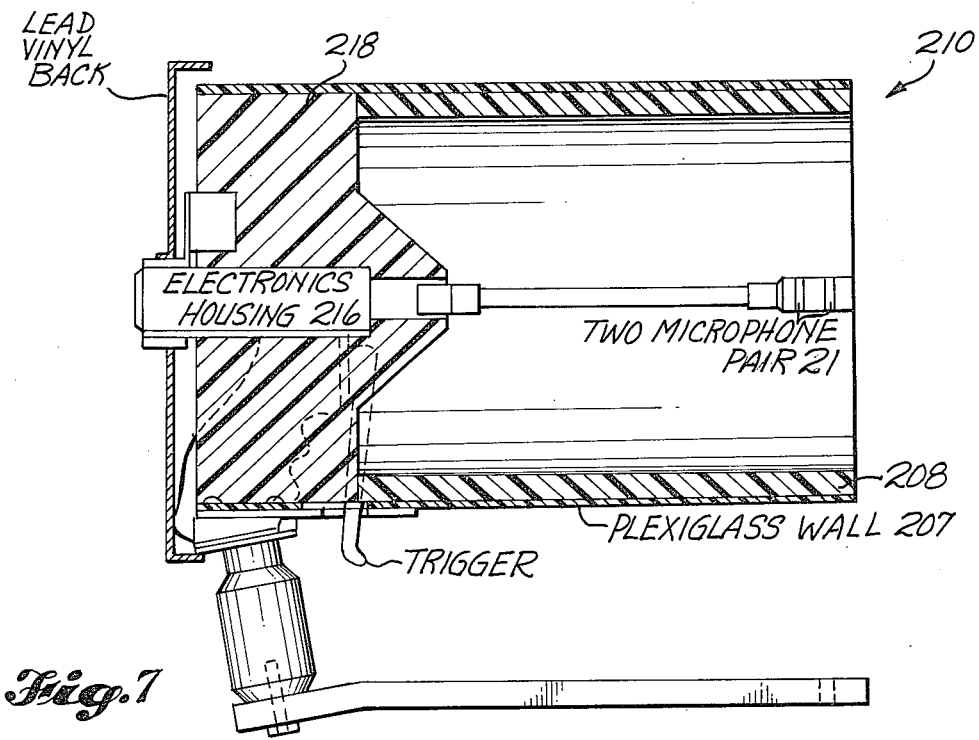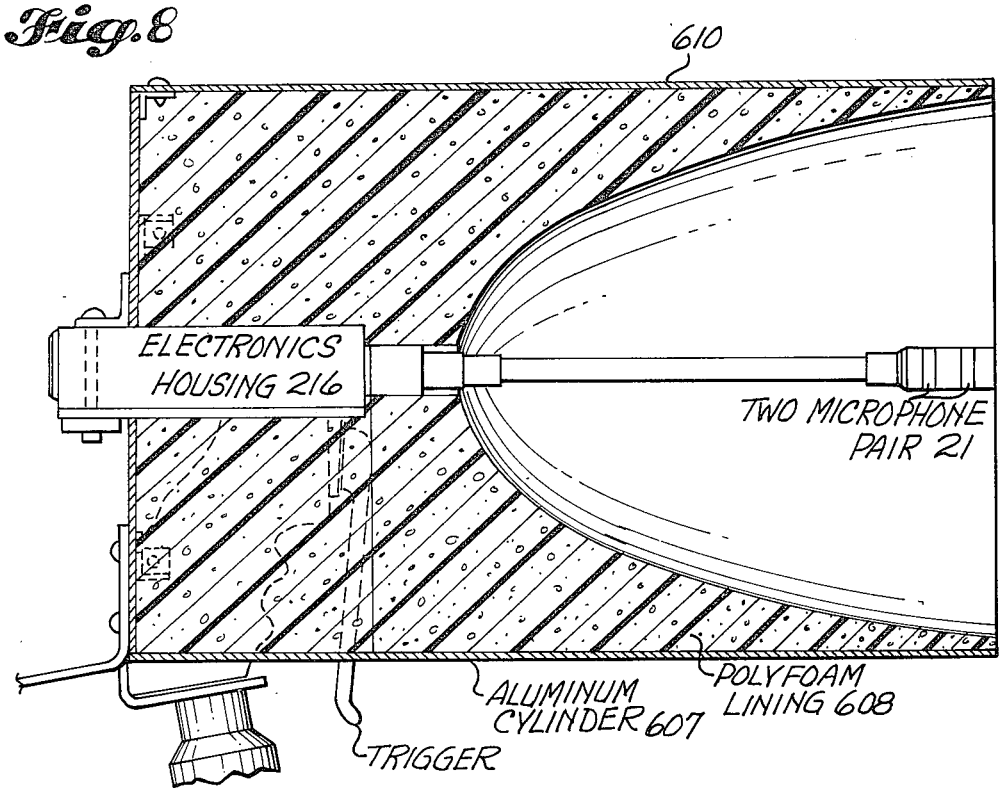

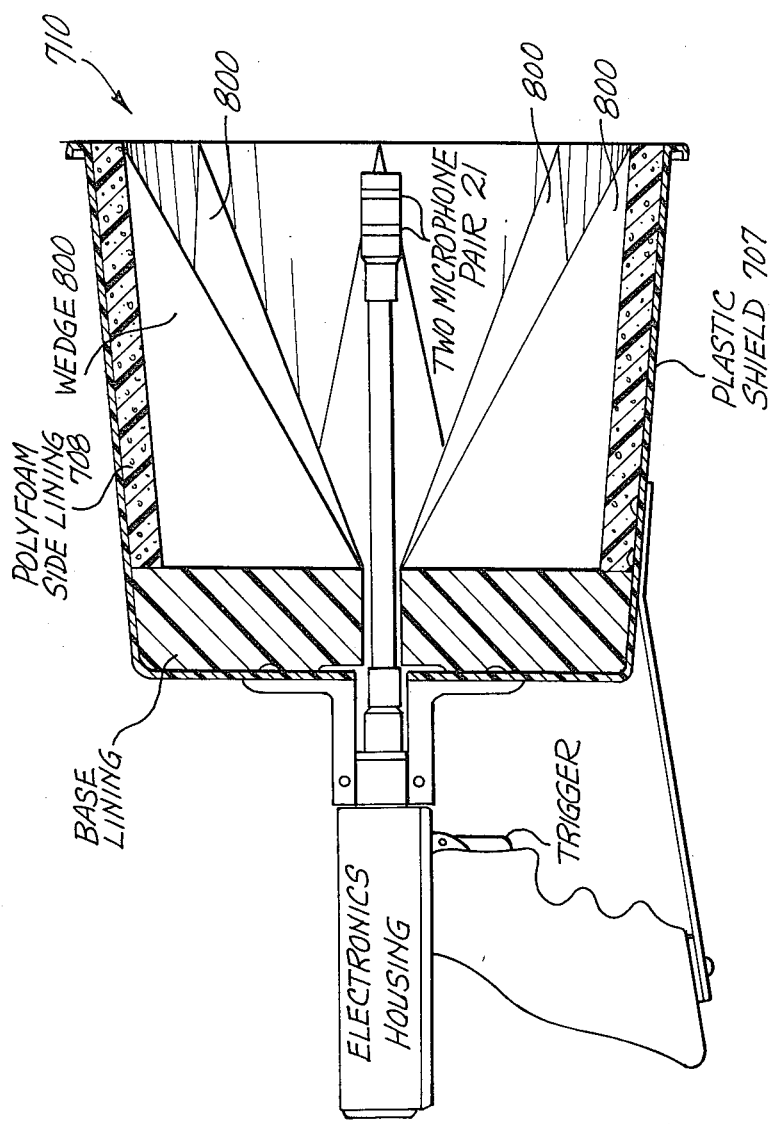

ACOUSTIC INTENSITY MEASUREMENT APPARATUS AND METHOD INCLUDING PROBE HAVING AMBIENT NOISE SHIELD

This invention relates to acoustic inspection apparatus and more particularly to an acoustic intensity measurement apparatus for locating and quantitatively evaluating noise sources in terms of radiated acoustic intensity in a manner which rejects both the incident and the reflected components of radiation from ambient sources.

The patent literature includes acoustical testing apparatus utilizing shielding material e.g. as shown in U.S. Pat. No. 3,783,967 issued Jan. 8, 1974 and U.S. Pat. No. 3,876,035, issued Apr. 8, 1975.

In practice, a problem faced by artisans in the noise measurement art is that of being able to locate and quantitatively evaluate noise sources in an aircraft cabin in terms of radiated acoustic intensity. More specifically, the direct radiation from cabin boundaries is required to be evaluated independently of contributions from other cabin noise sources at locations other than the measurement area. Measurements are required to be performed sufficiently rapidly for practical application during flight tests.

Heretofore, surface radiation has been characterized in terms of surface acceleration measured by sparsely placed accelerometers. Such an approach suffers from insufficient samples, slowness in measurement technique, and a relationship between surface motion and acoustic radiation is furthermore not well understood. Prior efforts at freefield microphone sampling have failed to discriminate direct radiation from the ambient field. The prior technique of basket microphone sampling eliminates the ambient field contribution; however, this method has the potential for disturbing the direct radiation because the basket touches the radiator, thereby affecting the vibration. Such technique also forms a closed cavity which distorts the field, especially at low frequencies. By measuring in the near field and sealing off a small measurement area, the near field effects can be distorted thereby causing an over-estimation of the radiation. Prior blanket wrapping covers all radiating surfaces except the one of interest. While this technique has potential for being very accurate, it is quite slow and cumbersome.

It is, accordingly, an object of the present invention to provide means including a pair of microphones and an acoustic absorber shield for acoustic inspection to determine sound energy emanating from a particular region such as a panel area of an aircraft structure.

It is a further object of the present invention to provide an acoustic inspection apparatus including a cup-shaped shield lined with contoured absorption material surrounding a microphone pair.

It is yet another object of the present invention to provide an acoustic intensity probe ambient noise shield associated with a probe structure including a pair of microphones in which there is no probe contact with the noise source area of inspection.

A full understanding of the invention, and of its further objects and advantages and the several unique aspects thereof, will be had from the following description when taken in conjunction with the accompanying drawings in which:

FIG. 7 is a cross-sectional view of a paired microphone acoustic intensity probe structure including an ambient noise shield in accordance with a third embodiment of the present invention;

FIG. 8 is a sectional view of a paired microphone acoustic intensity probe structure having an associated ambient noise shield in accordance with a fourth embodiment of the present invention; and FIG. 9 is a cross-sectional view of an acoustic intensity probe structure utilizing a microphone pair and having an ambient noise shield in accordance with a fifth embodiment of the present invention.

Figure 1:
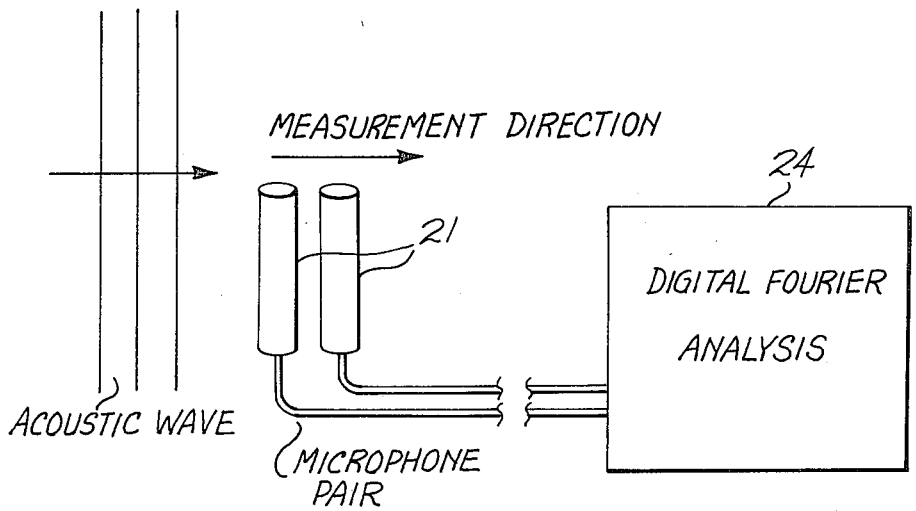
FIG. 1 is illustrative of a two-microphone acoustic intensity measurement device measuring the component of intensity in the direction along the axis between the microphone pair.

Turning now to FIG. 1, wherein there is shown a microphore pair 21 coupled downstream to a digital Fourier analyzer 24, it will be seen that such an acoustic intensity measurement apparatus measures the component of intensity in the direction along the axis between the microphone pair 21. Such a system approach yields the net result of all noise present and cannot distinguish between a direct field of interest and a field due to other sources.

Figure 2:
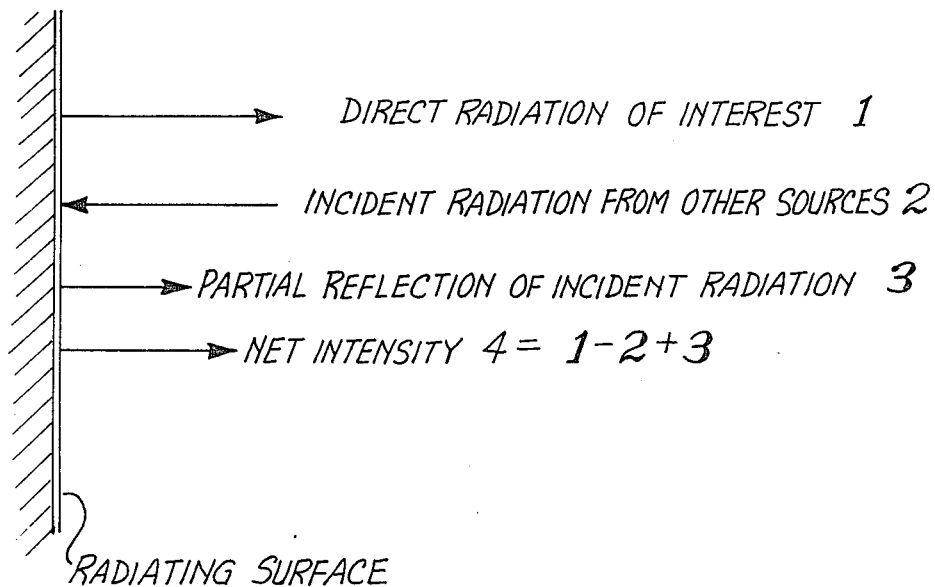
FIG. 2 is a diagram illustrative of how the net intensity measurement differs from that due to the direct field shown in the apparatus of FIG. 1.

FIG. 2 is a diagram illustrative of how the net intensity measurement differs from that due to the direct field shown in FIG. 1 above. In FIG. 2, it should be noted that, in addition to the direct field of interest 1, an intensity device also receives contributions from incident radiation from other sources 2 and the reflection of that radiation 3. The resulting net intensity shown at 4 in FIG. 2 is generally less than the direct radiation alone and, hence, is unacceptable in acoustic intensity measurements.

Figure 3:
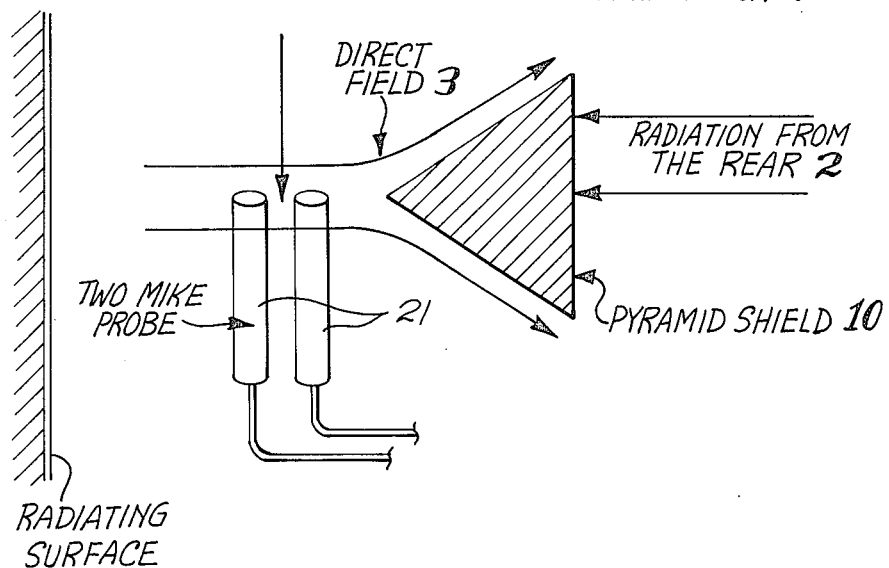
FIG. 3 is illustrative of a paired microphone intensity measuring apparatus of the type shown in FIG. 1, however, including a pyramid-shaped noise shield.

Turning now to the two-microphone intensity measurement probe structure shown in FIG. 3, it will be observed that a pyramid-shaped shield 10 is included in the probe structure shown in FIG. 3. The system design of FIG. 3 was utilized to block sound incident from the rear 2 while not reflecting the direct-field radiation 3 back toward the microphone pair 21. Such approach contemplates that the directivity of the device would reject tangential direct radiation 4 without a requirement for blocking such radiation.

Figure 4:
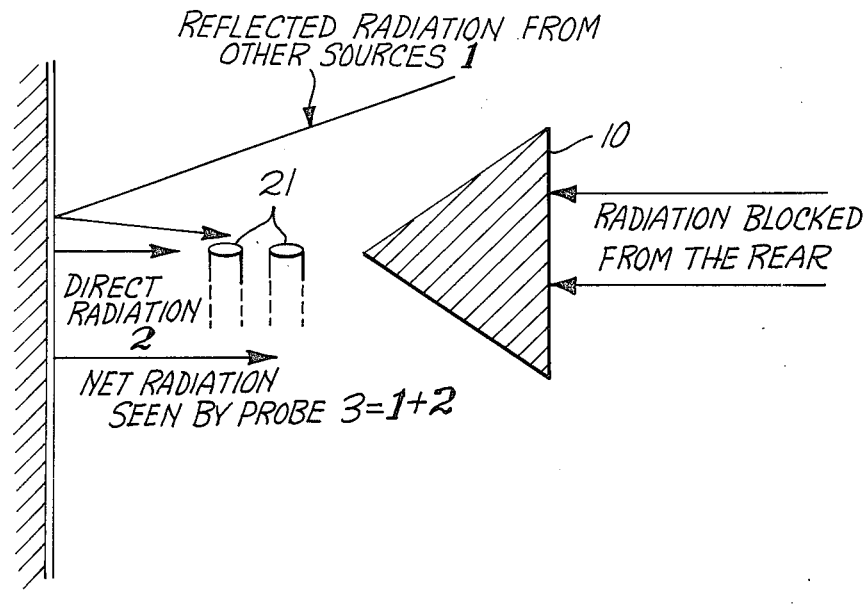
FIG. 4 is a diagram helpful in understanding the noise radiation pattern resulting from implementation of the apparatus shown in FIG. 3.

In FIG. 4, the diagram shows that the system concept of FIG. 3 fails in the sense that it does not reject the reflected component of radiation from other sources 1. As a result, the net radiation seen by the intensity probe pair 21 is the sum of the reflection 1 and the direct field 2 shown in the figure as net radiation seen by probe 3.

The net result is generally greater that the direct radiation alone.

Figure 5:
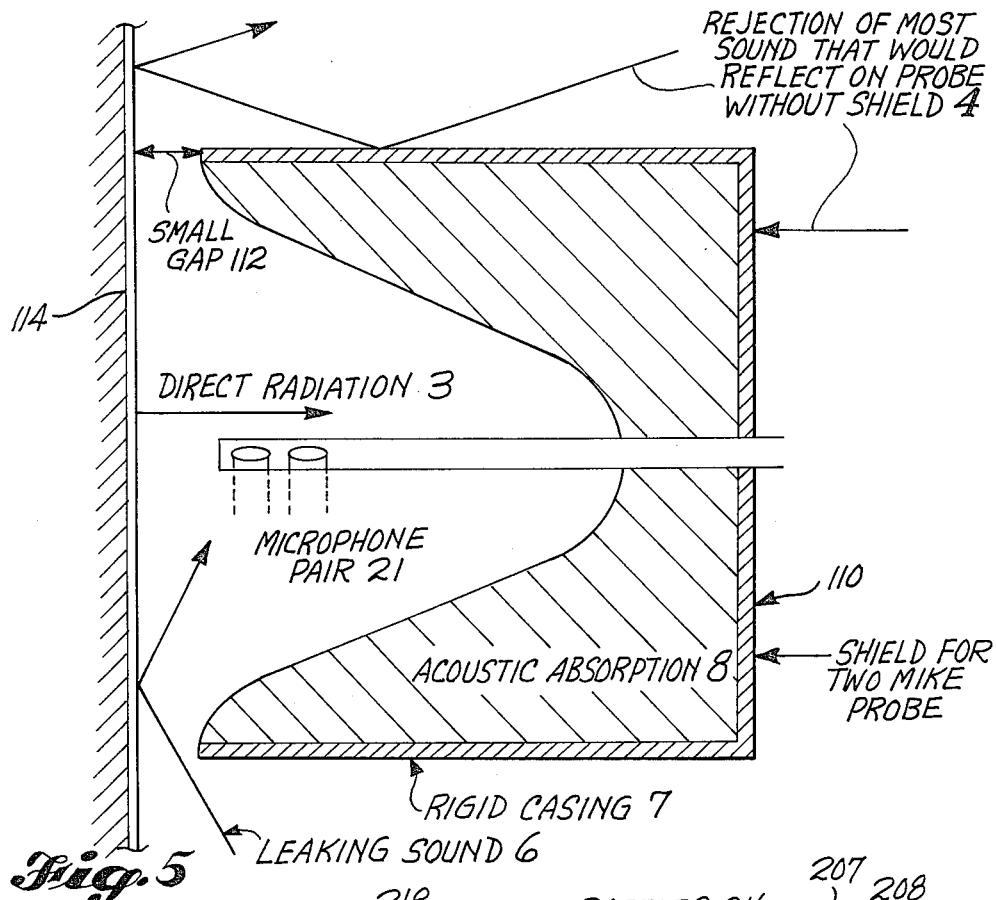
FIG. 5 is illustrative of a paired microphone intensity probe in accordance with a first embodiment of the present invention and including an acoustic shield having the desired characteristics in accordance with the present invention.

As a consequence of the preceding, a first embodiment of the present invention shown in FIG. 5 shows an acoustic shield 110 configured for use with associated microphone pair 21. The probe structure of FIG. 5 enables fulfillment of the following criteria:

The presence of acoustic shield 110 does not modify the measurement of the direct radiation shown at 3 significantly.

The direct path of all ambient sound 4 is sufficiently blocked that it does not contribute significantly to the measurement of direct radiation (or the direct contribution of the ambient field is reduced by at least 10 dB relative to the no-shield free-field case).

Acoustic ambient noise shield structure 110 can be utilized in close proximity to the radiating surface 5 so that sound of leakage 6 will be small, and that entering sound of leakage which results approaches the microphone pair 21 at a nearly tangential (90°) angle. The dipole directivity of the probe structure of FIG. 5 rejects the tangential component of the sound.

Acoustic ambient noise shield structure 110 includes a cup-shaped rigid sound reflecting casing member 7 having an interlining of an acoustic-absorbing material 8 of thickness sufficient to meet the first criterion hereinabove. Microphone pair 21 is shown disposed within cup-shaped rigid casing member 7, and the dimensions of acoustic intensity probe ambient noise shield 10 are variable but dependent upon the wavelengths of measurement interest and the shape and accessibility of the radius surface. In sound measuring utilizing the probe structure of FIG. 5, acoustic intensity probe ambient noise shield apparatus 110 is disposed with predetermined spacing 112 between the open end of cup-shaped rigid casing 7 and the surface source 114 of direct radiation 3.

Figure 6:
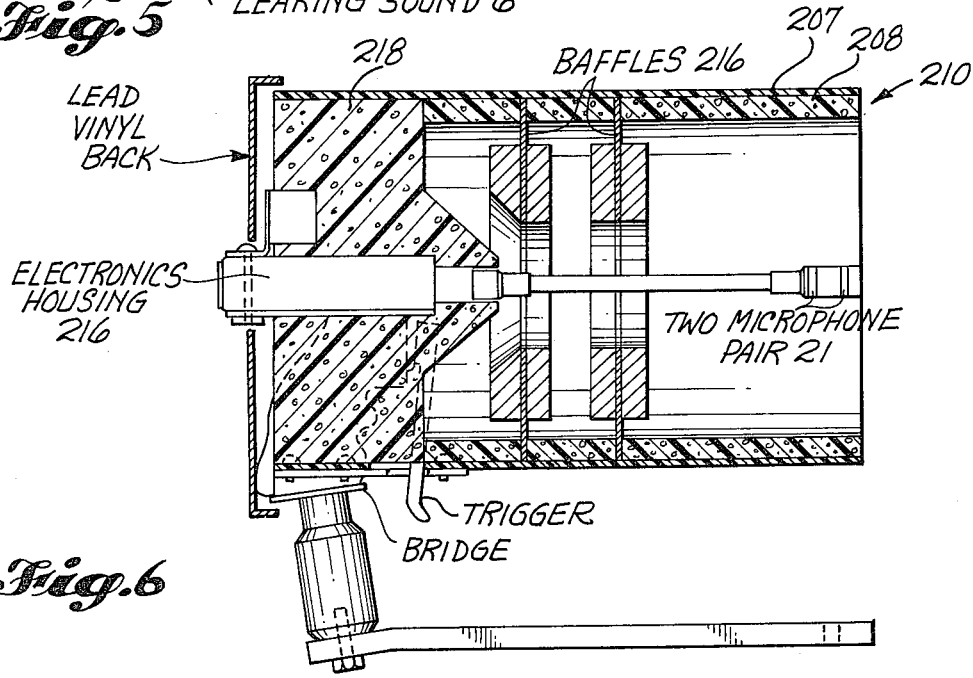
FIG. 6 is a sectional view of a probe in accordance with a second embodiment of the present invention having an acoustic shield providing the desired characteristics in accordance with the present invention.

Turning now to FIG. 6, it will be seen that microphone pair 21, in accordance with a second embodiment of the present probe structure, includes an acoustic intensity probe ambient noise shield 210 in which microphone pair 21 is mounted along the central axis of cylindrically-shaped rigid casing member 207 having acoustic absorption material 210 lining the inner surface of cylindrically-shaped rigid casing member 207. A pair of concentrically disposed baffle members 216 are concentrically disposed along the central axis of acoustic intensity probe ambient noise shield 210 between microphone pair 21 and the closed end of cylindrically-shaped rigid casing member 207. Electronic housing member 216 is shown disposed within and surrounded by further acoustic sound absorbing material 218 at the closed end of cylindrically-shaped rigid casing member 207.

FIG. 7 is illustrative of a third embodiment of the present invention having an acoustic intensity probe ambient noise shield structure 210 similar to the shield structure shown in FIG. 7, however, not including a pair of baffle members disposed within the cavity of acoustic intensity probe ambient noise shield structure 210 as was shown in the embodiment of FIG. 7.

Turning now to FIG. 8, a fourth embodiment acoustic intensity probe ambient noise shield structure 610 which showed favorable test results includes a cylindrically-shaped rigid casing member 607 comprising an aluminum cylinder having an inner lining of acoustic absorption material 608 e.g. polyfoam lining. It can be seen that the inner surface of acoustic absorption material 608 is of parabolic shape and extending rearward of microphone pair 21 dispersed along the central axis and at the mouth of acoustic intensity probe ambient noise shield 610.

A fifth embodiment of acoustic intensity probe ambient noise shield 710 is shown in FIG. 9. Cup-shaped acoustic intensity probe ambient noise shield member 710 shown in FIG. 9 is seen to include a plurality of wedge-shaped members 800 extending toward the open end of acoustic intensity probe ambient noise shield 710 for absorbing sound entering acoustic intensity probe ambient noise shield 710. Wedge-shaped members 800 provide axial splitting of noise entering acoustic intensity probe ambient noise shield 710 and consequent absorption thereof.

What is claimed is:

1. An acoustic intensity probe comprising in combination:
   an outer housing having an open end, said housing having a central axis and a sound absorbing chamber within said outer housing; and,
   a pair of microphones disposed along said central axis at the open end of said outer housing.

2. In an acoustical testing apparatus, a probe including:
   a pair of microphones; and
   an acoustic intensity probe ambient noise shield enclosing said pair of microphones so that the dipole directivity of said probe attenuates the tangential component of sound radiation from a radiating source.

3. In the method of measuring sound intensity from a noise source:
   disposing a pair of microphones along the central axis of an open ended housing;
   disposing the open end of said open ended housing a predetermined distance from a flat radiating surface; and then,
   coupling said microphone pair to a digital Fourier analyzer for measuring the sound intensity from said flat radiating surface.

4. The method of measuring sound intensity from a flat-shaped panel noise source which includes the step of disposing a two-microphone housing a predetermined distance from said flat-shaped panel noise source so that sound leakage entering said two-microphone housing approaches a two-microphone pair disposed along a central axis of said two-microphone housing at a substantially tangential angle.

* * * * *